May 7, 1946. C. E. BENNETT 2,399,849
METHOD OF LINING PIPE WITH PLASTIC MATERIAL
Filed Feb. 8, 1945
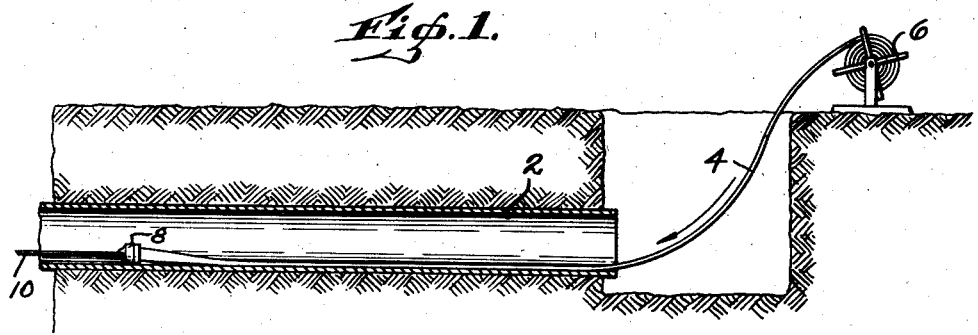
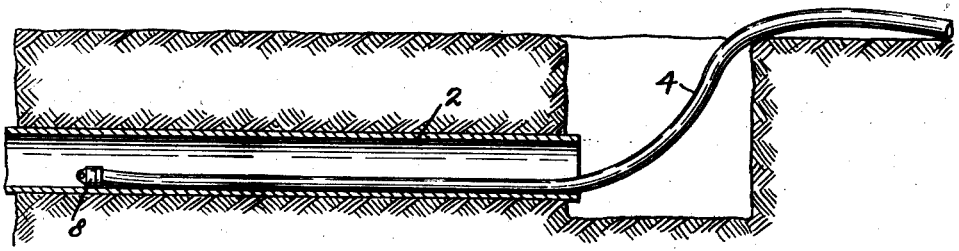
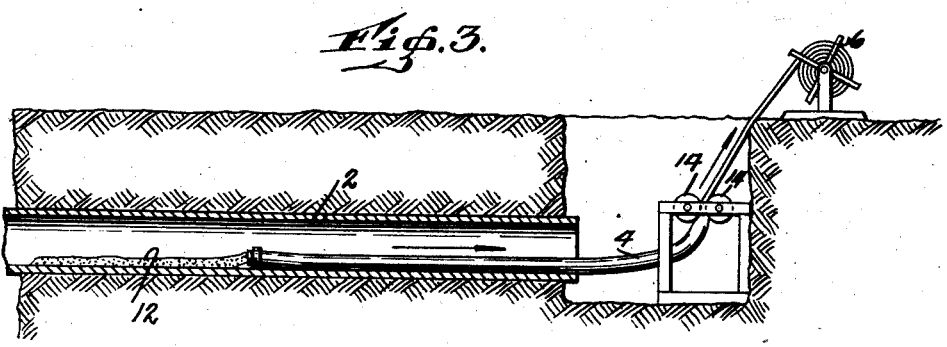
INVENTOR
CHARLES E. BENNETT
BY
ATTORNEY Patented May 7, 1946

2,399,849

UNITED STATES PATENT OFFICE 2,399,849

METHOD OF LINING PIPE WITH PLASTIC MATERIAL

Charles E. Bennett, Ridgewood, N. J.

Application February 8, 1945, Serial No. 576,831

4 Claims. (Cl. 25—38)

This invention is directed to a process for lining pipes, and one of its objects is to provide an improvement on the process and apparatus disclosed in my prior Patent 2,204,785 of June 18, 1940.

In that patent I disclose a process for lining pipe with non-metallic plastic material, cement for example, wherein a conveyor, such as a hose for instance, is drawn into the pipe to be lined, the hose being deflated and loaded with the lining material. After the conveyor has been drawn in it is inflated so as to unload the same, the hose of course rising to the top of the lining material. The hose is then removed and the lining material spread upon the pipe walls.

The process of the present invention differs from this prior process and has certain advantages thereover. According to my improved process I introduce a line of hose or other tubular flexible member into the pipe to be lined. The tubular member is empty and hence easy to handle as compared with the loaded conveyor employed in my prior patent. The leading end of this tubular member is capped and after it has been inserted into the pipe to the distance desired, for example, from one manhole to the next, it is charged with the lining material.

The cap on the tubular member is then removed and the tubular member removed from the pipe. In removing the tubular member its flexible walls are subjected to pressure, as by passing between pressure rollers located at the end of the pipe through which the member is being removed. This squeezes the lining material out of the tube as the latter is moving out of the pipe, thereby depositing the lining material uniformly, continuously and progressively along the bottom of the pipe the full length of the pipe. The lining material may then be spread on the pipe wall in any suitable manner as, for example, in the same way as set out in my prior patent.

In the drawing wherein I have illustrated an embodiment of my invention:

Fig. 1 is an elevational view partly in section showing the charging member being inserted into the pipe;

Fig. 2 is a similar view showing the charging member filled with the lining material; and Fig. 3 is a similar view showing the lining material being unloaded.

Referring to the drawing in detail: 2 designates a pipe to be lined. The pipe has been shown as buried in the ground. It will be appreciated that the pipe may be any length. In practice it may be desirable to line the pipe from one manhole to the next. However, this is immaterial to my invention, the length of pipe which may be lined in the one operation being limited only by equipment available.

4 designates the charging member, that is to say, the member through or by which the lining material is charged to the pipe 2. This member is conveniently a canvas and/or rubber hose, or it may be of metal. This is immaterial so long as the same is flexible and light enough in weight to be handled readily and has compressible or collapsible walls.

The charging member 4 is set up on a reel 6 located at the charging end of the pipe.

The leading end of the charging member is closed by removable cap 8, which is conveniently utilized for the attachment of a cable 10 by which the charging member is introduced into the pipe.

As above explained the empty charging member 4 is first inserted into the pipe 2 by drawing in with cable 10 or any other convenient fashion. This member will be inserted whatever distance is to be lined, from one manhole to the next, for example. This procedure is illustrated in Fig. 1.

The cement 12 or other plastic lining material is then charged to the member 4. By properly dimensioning the member 4 it will be appreciated that substantially the exact amount of lining material is charged to member 4 for lining the length of pipe under consideration.

Up to this time the cap 8 has been left in place, so that the leading end of the charging member is sealed.

The cap 8 is then removed and the member 4 removed from the pipe. In this operation it passes between driven pressure rollers 14 so that as the charging member is being removed its walls will be progressively and continuously collapsed so that the lining material will be squeezed out of the same and deposited uniformly and progressively along the bottom of the pipe length to be lined, as illustrated in Fig. 3.

Thereafter the lining material may be spread about the pipe walls by the procedure disclosed in my prior patent above referred to, or in other suitable fashion.

It will be seen from all of the foregoing that I have provided a method for lining pipes wherein I first of all introduce a flexible walled tubular member into the pipe which functions as a charging member, whereby the lining material may be conducted into the pipe for distribution along the pipe bottom. It will be apparent also that I next remove this charging member and in this step of my method the lining material is discharged from the charging member and deposited uniformly and progressively upon the pipe bottom.

It is to be understood that it is within the purview of this invention to introduce the charging member 4 into the pipe by means other than that indicated. In some instances it may be feasible to push it along the pipe from the entering end instead of drawing it in.

It is to be understood also that instead of reversing the movement of the charging member to remove it and deposit the lining material upon the pipe bottom, the charging member after it has been loaded may be drawn out of the exit end of the pipe through rollers such as 14 located at the exit end of the pipe forcibly to discharge the lining material uniformly and progressively upon the pipe bottom.

It will be appreciated that the presser rollers 14 may not only collapse the walls of the member 4 to effect ejection of the lining material, but they may function to effect the removal of this member.

It will be appreciated that the procedure herein disclosed is superior to the method of my prior patent in that the charging member is empty when introduced into the pipe, instead of loaded as in my prior patent, which will permit me to employ relatively inexpensive materials so far as the charging member is concerned, even though the charging member at the beginning of its removal from the pipe is fully loaded; the fact remains that after unloading is begun the load is being constantly reduced.

I find also that the present method is superior to the method of my prior patent in that there can be no sticking of the material to the charging member due to the fact that pressure is applied to the lining material from the rear so that it is necessarily all ejected.

What I claim is:

1. In the lining of pipe with plastic material, the method which comprises drawing a flexible walled tubular member into the pipe to be lined, charging the tubular member with the lining material and thereafter while withdrawing the tubular member applying pressure to the exterior of said member forcibly to eject its contents upon the bottom of the pipe and thereby provide a deposit of lining material of substantially uniform depth along the pipe bottom.

2. In the lining of pipe with plastic material, the method which comprises laying a flexible walled tubular member along the bottom of the pipe to be lined, charging the tubular member with the lining material and thereafter while removing the tubular member collapsing the walls thereof forcibly to eject the charging material upon the pipe bottom.

3. In the lining of pipe with plastic material, the method which comprises laying a flexible walled tubular member along the bottom of the pipe to be lined, filling the tubular member with the lining material and thereafter removing the tubular member by passing the same through presser rollers thereby to effect continuous and progressive collapse of the walls of the tubular member forcibly and progressively to eject the lining material in a uniform layer upon the pipe bottom.

4. In the lining of pipe with plastic material, the method which comprises laying a flexible walled tubular member along the bottom of the pipe to be lined, filling the tubular member with the lining material and thereafter effecting the simultaneous, continuous and progressive removal of the tubular member and continuous and progressive ejection of the lining material from the tubular member and its deposit in the bottom of the pipe by engaging the tubular member between a pair of driven presser rollers.

CHARLES E. BENNETT.